United States Patent [19]

Criscione, II et al.

[11] Patent Number: 4,961,248

[45] Date of Patent: Oct. 9, 1990

[54] SCALDER APPARATUS

[75] Inventors: Frank J. Criscione, II, Kansas City, Mo.; James A. Bonuchi, Overland Park, Kans.; David R. Crawford, Blue Springs, Mo.

[73] Assignee: Johnson Food Equipment, Inc., Kansas City, Kans.

[21] Appl. No.: 467,730

[22] Filed: Jan. 19, 1990

[51] Int. Cl.⁵ ............................................. A27C 21/04
[52] U.S. Cl. .......................................... 17/11.2; 17/51
[58] Field of Search ................................. 17/11.2, 51

[56] References Cited

U.S. PATENT DOCUMENTS

| | | | |
|---|---|---|---|
| 2,549,070 | 4/1951 | Drews | 17/11.2 |
| 2,820,245 | 1/1958 | Turner | 17/11.2 |
| 2,942,429 | 6/1960 | Van Dolah et al. | 17/11.2 |
| 3,138,822 | 6/1964 | Amstad | 17/11.2 |
| 3,253,296 | 5/1966 | Brown | 17/11.2 |
| 3,631,563 | 1/1972 | Snowden | 17/11.2 |
| 3,657,768 | 4/1972 | Snowden | 17/11.2 |

Primary Examiner—Willis Little
Attorney, Agent, or Firm—Hovey, Williams, Timmons & Collins

[57] ABSTRACT

A poultry scalding apparatus includes an elongated first tank section having opposed side walls, end walls and a bottom wall, and defining a poultry travel path extending generally in the longitudinal direction of the first tank section. Water is delivered via troughs to the first tank section from both sides of the poultry travel path at a generally constant height along at least a portion of the length of the first tank section, and a conveyor is provided for conveying poultry along the poultry travel path in a head-down orientation while preferably moving the poultry vertically relative to the water delivery troughs as the poultry travels along the portion of the length of the first tank section in which the water delivery troughs are disposed. The poultry is moved between a first elevation at which the poultry is supported at least partially above the height at which water is delivered to the first tank section and a second elevation at which the poultry is supported substantially completely beneath the height at which water is delivered to the first tank section such that the head and neck of the poultry is exposed to the water for a longer period of time then the remainder of the poultry. At no time during the movement of the poultry through the first tank section does the head of the poultry become submerged beneath the waterline of the first tank section. A second tank section may be provided adjoining the first tank section and defining a continuance of the travel path. The second tank section includes a water level sufficient to permit the poultry to be substantially submerged during continued conveyance along the travel path such that scalding of the poultry may be performed.

16 Claims, 2 Drawing Sheets

SCALDER APPARATUS

BACKGROUND OF THE INVENTION

1. Field of the Invention

The present invention relates generally to poultry dressing devices and, more particularly, to a method and apparatus for scalding poultry on a continuous basis to promote feather muscle relaxation in order to facilitate of the feathers from the poultry during a subpicking sequent picking operation and to reduce the amount of bacteria present on poultry exiting the picking device.

2. Discussion of the Prior Art

It is known to provide a poultry scalding device which utilizes streams of scalding liquid that are permitted to fall upon birds as they are advanced submerged through a scalding tank. The force of such liquid being exceedingly great, the feathers of the poultry are subjected to a rather violent scalding action, simplifying the subsequent removal thereof by conventional feather picking machines. One problem commonly encountered in devices of this type resides in the failure of the cascading scalding water to properly scald the neck of the bird due at least partially to the fact that the neck of the bird is protected from falling liquid by the remainder of the bird and thus the water adjacent the neck of the bird is not agitated sufficiently to carry out a proper scald of the neck area.

In these known scalding devices, water is delivered to a tank at an outlet end of a conveyor path and is drained from the tank at a conveyor inlet such that a water flow path is defined which is opposite to the direction of travel of the poultry through the first section of the scalder apparatus. In this manner, each bird is introduced into the apparatus at the inlet where the water is dirty and travels into cleaner water when entering the final stage of the scalder.

Another problem known to exist in scalding devices of the conventional type is that it is possible for birds to aspirate dirty water while passing through the inlet region of the tank since the birds are not always completely dead when they enter the scalding device. When aspiration occurs, bacteria from the dirty water is allowed to get into the bird causing the bird to be dirtier than if no such aspiration of the scalding water had occurred.

SUMMARY OF THE INVENTION

It is an object of the present invention to provide a scalding apparatus that provides a complete scalding of the product while exposing the head and neck of each bird to a cascading scalding liquid for an additional period of time during the scalding operation in order to promote feather muscle relaxation in hard-to-pick areas of the poultry.

Another object of the invention is to provide a scalding apparatus which makes conservative use of scalding liquid by introducing poultry to the liquid adjacent a drain of the apparatus where the liquid is dirtiest, and conveying the poultry through progressively cleaner fluid as the poultry travels toward an outlet of the apparatus.

Further, it is an object of the invention to provide a scalding apparatus in which poultry is cleaned during an initial stage of scalding and is thoroughly surrounded with agitated scalding liquid during a subsequent scalding stage such that the poultry, when it exits a downstream picking device, has less bacteria than in conventional scalders of the type mentioned above. Thus, it is a goal of the invention to provide a scalding method and apparatus that results in a cleaner picked bird that will have a longer shelf life than birds scalded according to conventional methods.

According to one aspect of the invention, a poultry scalding apparatus includes an elongated tank having a pair of side walls, end walls and a bottom wall, and defining a poultry travel path extending generally in the longitudinal direction of the tank. The tank is adapted to hold water therein and means are provided for maintaining a waterline in the tank at a first predetermined height above the bottom wall. Cascading means cascade scalding water into the tank and onto the travel path from a second predetermined height above the waterline along a preset length of the travel path and conveying means convey poultry along the travel path with the poultry supported substantially completely beneath the second predetermined height and completely above the waterline in the tank so that the poultry is scalded by the cascading water while being maintained completely above the waterline in the tank.

The conveying means preferably includes lowering and lifting means for moving the poultry vertically during movement along the travel path between a first elevation at which the poultry is supported at least partially above the second predetermined height and a second elevation at which the poultry is supported substantially completely beneath the second predetermined height such that the head and neck of the poultry is exposed to cascading water for a longer period of time than the remainder of the poultry, the poultry being supported completely above the waterline during movement between the first and second elevations.

According to a second aspect of the invention, a scalding apparatus includes an elongated first tank section, means for maintaining a waterline in the first tank section at a first predetermined height above the bottom wall, water delivery means for delivering water to the first tank section from both sides of a poultry travel path at a generally constant height above the waterline along at least a portion of the length of the first tank section, and conveying means for conveying poultry along the poultry travel path in a head-down orientation with the poultry disposed substantially below the height at which water is delivered to the first tank section and with the poultry supported completely above the waterline. An elongated second tank section adjoins the first tank section and defines a continuation of the poultry travel path, the second tank section being filled with water to a second predetermined vertical height. The conveying means conveys poultry along the poultry travel path of both the first and second tank sections such that the poultry is conveyed within the second tank section along the poultry travel path with the poultry disposed substantially completely beneath the water therein.

During testing of the present invention, it has been found that by employing a scalding apparatus in accordance with the present invention, it is possible to scald poultry in such a manner that, although the poultry may include more bacteria as it exits the scalding apparatus than poultry scalded in a conventional cascading type submersion tank scalder, the poultry includes up to 50% less bacteria upon leaving a picking apparatus downstream of the scalding apparatus. This result of poultry being cleaner than poultry scalded by conventional methods upon leaving the picking apparatus, while being dirtier immediately upon exiting the scalding apparatus, is unexpected since it seems logical that if the conventionally scalded poultry is cleaner when it exits the scalding apparatus, then it should be cleaner after passing through the picking apparatus. The significance of having a picked bird with less bacteria than conventionally prepared birds results in a prolonged shelf life of poultry scalded in accordance with the invention as compared to the shelf life of birds scalded in conventional devices.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
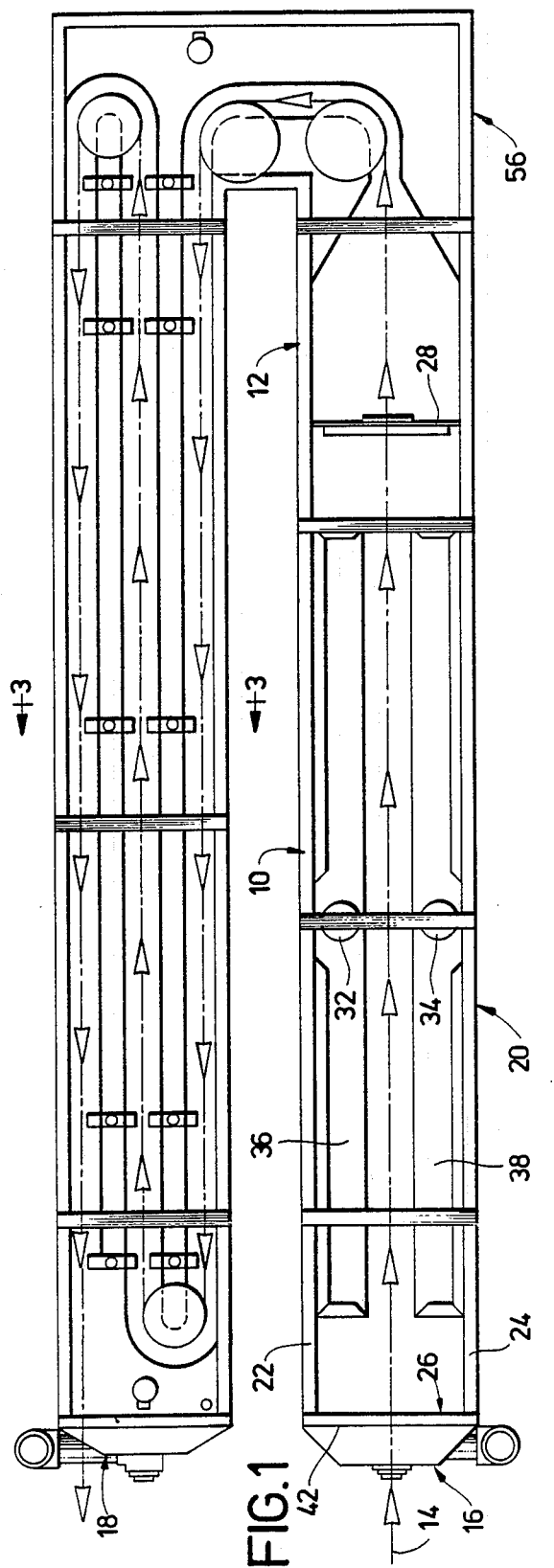
FIG. 1 is a schematic plan view of a scalding apparatus constructed in accordance with the preferred embodiment.

A scalding apparatus constructed in accordance with a preferred embodiment of the invention is illustrated in FIG. 1, and includes two adjoining scalding sections or stages 10, 12. A continuous travel path is illustrated by the arrow 14 in FIG. 1, which extends through the scalding stages 10, 12 between an inlet end 16 of the first section 10 and an outlet end 18 of the second section 12. This travel path is the path along which birds travel during a scalding operation carried out in accordance with the invention.

Figure 4:
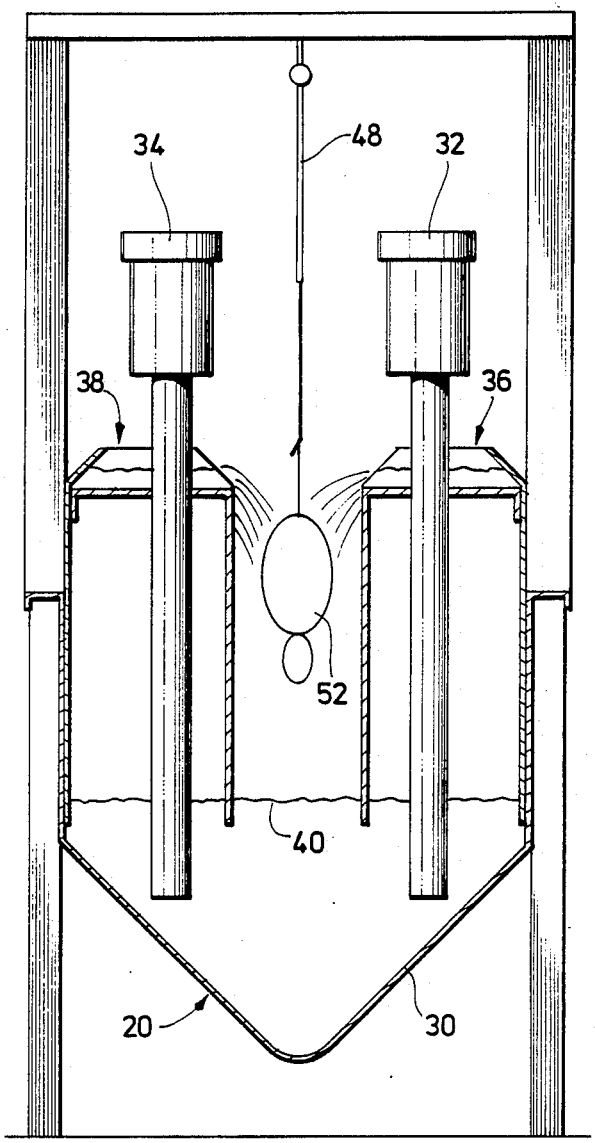
FIG. 4 is a schematic sectional view taken along line 4—4 of FIG. 2.

The first scalding section 10 includes an elongated tank 20 having a pair of side walls 22, 24 end walls 26, 28 and a wall bottom 30, shown in FIG. 4, and extends along the poultry travel path. The tank 20 is constructed to hold water in the lower portion thereof and a pair of pumps 32, 34 are provided in the tank which pump water from the lower portion of the tank to a water cascading means including a pair of troughs 36, 38. The troughs are constructed to cascade scalding water into the tank 20 and onto the travel path from a predetermined height above the waterline 40 in the tank along a present length of the travel path.

Figure 2:
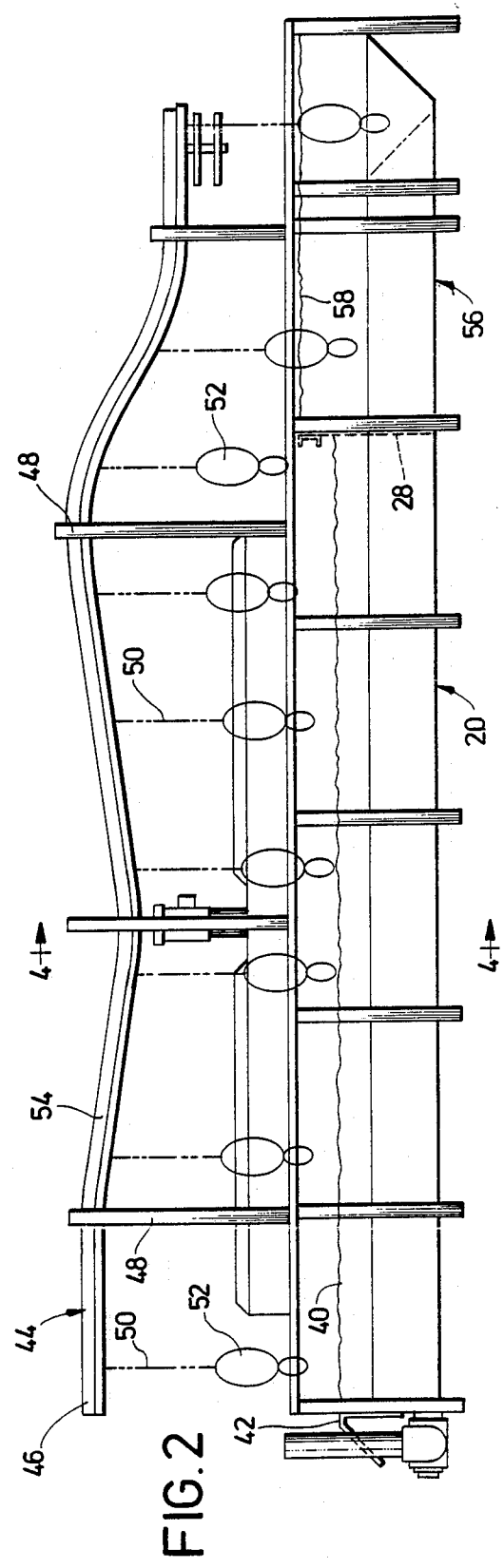
FIG. 2 is a schematic side elevation view of the scalding apparatus of FIG. 1.

The waterline 40 in the tank 20 is maintained by an overflow drain or weir 42, shown in FIG. 2, which permits water above a preset level to drain from the tank. At the opposite end of the tank 20, the end wall 28 defines a weir over which water from the second section 12 of the apparatus is permitted to flow when the water level in the second section exceeds the height of the weir. Scalding water is initially fed to the apparatus at the outlet end 18 of the second section 12 by any conventional means and flows through the apparatus in the reverse direction to the direction of travel of the poultry such that as water travels from the second stage 12 through the first stage 10 and over the overflow drain 42.

By constructing the apparatus in this manner, a reverse flow scalding apparatus results in which dirty water is used in the initial stage of the scalding operation to clean incoming birds and prepare them for a final scald, while cleaner water is used to actually carry out a substantial portion of the scalding operation. Further, by separating the first and second stages, the water in the second stage is maintained in cleaner condition because the dirty water used to clean incoming birds is not allowed to mix with the water used in the second stage of scalding. This is significant since a substantial amount of the dirt removed from birds during scalding is washed from the bird during the initial stage of the scald.

As shown in FIG. 2, a conveying means 44 is provided for conveying poultry along the travel path with the poultry supported substantially completely beneath the cascading water and completely above the waterline 40 in the tank 20 so that the poultry is scalded by water cascading onto the travel path from the troughs 36, 38 without being submerged beneath the waterline 40. The conveying means 44 preferably includes a conveyor track 46 supported by a frame 48 of the apparatus and a plurality of shackles 50, each of which moves along the track 46 and supports a bird 52 in a head-down orientation.

The conveying means includes lowering and lifting means for moving the poultry vertically during movement along the travel path through the tank 20 of the first scalding section 10 from an upper elevation at which the poultry is supported at least partially above the cascading water to a lower elevation at which the poultry is supported substantially completely beneath the cascading water. Thereafter, the lowering and lifting means returns the poultry to the upper elevation so that the birds may be passed over the separator plate 28 and into the second stage 12 of the scalding apparatus. Preferably, the lowering and lifting means includes a section 54 of the conveyor track which is angled relative to a horizontal plane so as to adjust the height of the poultry relative to the tank 20.

By providing the lowering and lifting means, the head an neck of the poultry is exposed to cascading water for a longer period of time than the remainder of the poultry so that a more thorough washing and scalding of the head and neck region of each bird is carried out. Thus, it is possible to concentrate scalding fluid on the tough-to-reach and tough-to-pick neck region of the poultry without over-scalding the remainder of the bird.

In addition, the poultry is supported completely above the waterline 40 during the entire length of movement between the first and second elevations such that the head of each bird is prevented from being submerged during passage through the first scalding section 10. By maintaining the head of the birds above the waterline in this manner, it is possible to prevent the birds from breathing dirty water into their lungs during the initial scalding stage during which time some birds may still be capable of breathing. Also, by providing the cascading action of the water, the feathers of the birds are opened and cleaned to permit complete scalding in the second section.

A cross-sectional view of the first section of the inventive scalding apparatus is illustrated in FIG. 4, which shows the orientation of a bird in the tank 20 relative to the troughs 36, 38 and the waterline 40 when the bird is nearing the lowered position. As shown in the figure, when the bird is in the lowered position corresponding to the lowest point on the conveyor track 46, a substantial portion of the bird is supported beneath the cascading water being dumped into the tank from the troughs.

In operation, the pumps 32, 34 continuously pump dirty water from the lower portion of the tank 20 up into the troughs 36, 38 so as to provide a continuous flow of water onto the poultry. In this manner, the bird is thoroughly cleaned in the first scalding section 10 prior to passing over the separator plate 28 into the second section 12. Further, by lowering each bird into and out of the position shown in FIG. 4 during movement of the poultry through the first section 10 beneath the troughs 36, 38, the head and neck of each bird 52 is exposed to cascading water for a longer period of time than the remainder of the bird so as to concentrate the scalding or near scalding water of the first stage on this hard-to-pick area of the poultry.

Returning to FIG. 1, the second section 12 of the scalding apparatus is illustrated as including an elongated, generally L-shaped tank 56 adjoining the first tank 20 and defining a continuation of the poultry travel path. As shown in the figure, the second tank 56 is a three pass scalding tank of generally conventional construction and includes dividers 58 which separate the tank into three separate lengths through which each bird 52 travels during passage through the apparatus. The arrow line 14 illustrates the path of travel through the second tank 56. It is noted that although a three-pass tank is shown in FIG. 1, it is possible to provide a two or more pass tank or to provide a plurality of separate tanks so long as a scalding path is defined which provides a sufficient scalding to be carried out on a continuous basis.

As shown in FIG. 2, the waterline 58 in the second tank is maintained at a level higher than the waterline 40 in the first tank 20 by the separator plate 28. Further, the conveyor track 46 is constructed to lower each bird into the second tank 56 to a depth sufficient to submerge each bird almost completely underwater during travel of the birds along the path through the second tank. Thus, the poultry is submerged during substantially the entire travel time through the second tank 56 and travels from an inlet position adjacent the separator plate 28 through increasingly cleaner and cleaner scalding water toward the outlet end 18 of the second tank 56.

Figure 3:
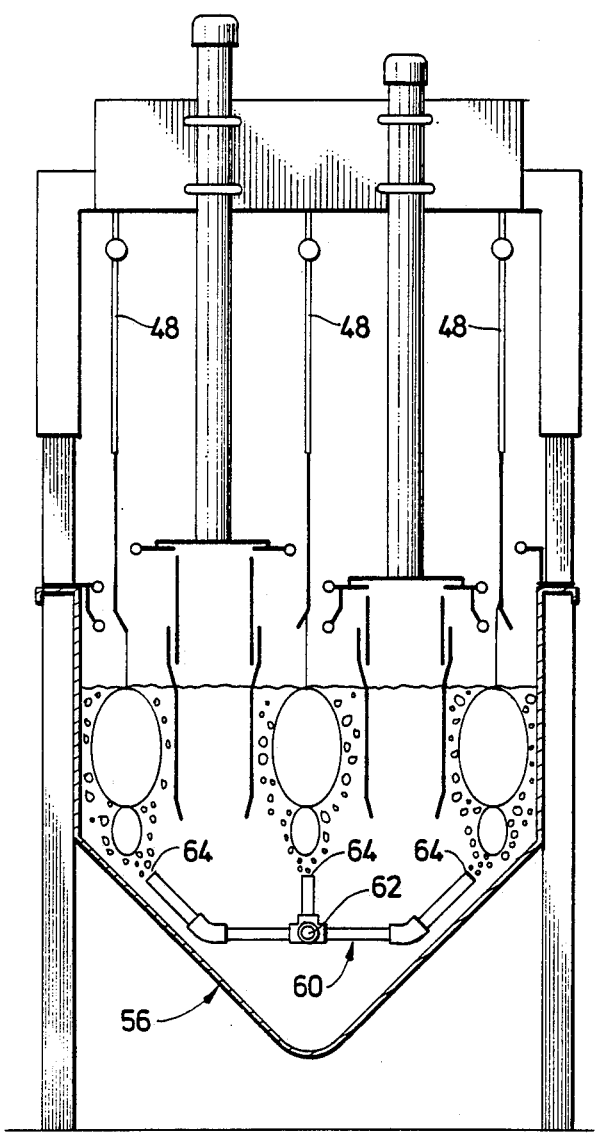
FIG. 3 is a schematic sectional view taken along line 3—3 of FIG. 1.

In FIG. 3 the second tank is shown as including an agitation means 60 for agitating the scalding water surrounding the birds in the tank 56 during passage of the birds along the travel path. The agitation means is shown as including air introduction means for introducing air into the tank which rises through the water causing turbulence. Preferably, an air supply pipe 62 is employed to introduce the air into the second tank through a plurality of orifices 64 aligned with each of the passes of the poultry travel path. However, other known means may be provided for agitating the water in the second tank so as to insure an adequate scald of the poultry passing through the apparatus. For example, it is possible to provide a trough arrangement which delivers cascading scalding water to the top of the second tank so as to create turbulence in the water surrounding the poultry. Also, such cascading techniques may be used in conjunction with air introduction means in order to further expedite agitation of scalding water in the tank.

In accordance with the invention, the preferred method of scalding poultry includes the steps of delivering water to the first tank 20 from both sides of the poultry travel path, maintaining the water level in the first tank 20 at a generally constant preset height, and conveying poultry along the poultry travel path in a head-down orientation and simultaneously moving the poultry vertically as the poultry travels along the travel path between a first elevation at which the poultry is supported at least partially above the height at which water is delivered to the first tank 20 and a second elevation at which the poultry is supported substantially completely beneath the height at which water is delivered to the first tank such that the head and neck of the poultry is exposed to the water for a longer period of time than the remainder of the poultry.

Once the poultry has been conveyed through the first tank 20, it is conveyed to the second tank 56 and submerged completely beneath the scalding water while being moved from a position adjacent the separator plate 28 to the outlet end 18 of the tank 56. The water adjacent the poultry is agitated continuously during movement of the poultry therethrough so that the poultry is thoroughly scalded in the follicle region where it is important to relax the muscles in order to make picking of the feathers easier. In addition, the poultry is continuously moved into cleaner water during travel through the second tank 56 so that when the poultry exits the scalding apparatus, it is as clean as possible.

Although the invention has been described with reference to the illustrated preferred embodiment, it is noted that variations and changes may be made and equivalents employed herein without departing from the scope of the invention as recited in the claims. For example, although the first stage of the scalding apparatus is illustrated as being associated with a second tank in which the poultry is shown as being submerged, it is possible to employ the first tank with other types of scalding devices or to employ the first tank alone as a washing or scalding apparatus.

What is claimed is:

1. A poultry scalding apparatus comprising:
   an elongated tank having a pair of side walls, end walls and a bottom wall, and defining a poultry travel path extending generally in the longitudinal direction of the tank, the tank being adapted to hold fluid therein;
   means for maintaining a fluidline in the tank at a first predetermined height above the bottom wall;
   cascading means for cascading fluid into the tank and onto the travel path from a second predetermined height above the fluidline along a preset length of the travel path; and
   conveying means for conveying poultry along the travel path with the poultry supported substantially completely beneath the second predetermined height and completely above the fluidline in the tank so that the poultry exposed to by the cascading fluid while being maintained completely above the fluidline in the tank.

2. The poultry scalding apparatus as recited in claim 1, wherein the conveying means includes lowering and lifting means for moving the poultry vertically during movement along the travel path between a first elevation at which the poultry is supported at least partially above the second predetermined height and a second elevation at which the poultry is supported substantially completely beneath the second predetermined height such that the head and neck of the poultry is exposed to cascading fluid for a longer period of time than the remainder of the poultry, the poultry being supported completely above the fluidline during movement between the first and second elevations.

3. The poultry scalding apparatus as recited in claim 2, wherein the conveying means sequentially moves the poultry from the first elevation to the second elevation and again toward the first elevation during movement of the poultry along the poultry travel path.

4. The poultry scalding apparatus as recited in claim 2, wherein the means for maintaining the fluidline in the tank at a first predetermined height above the bottom wall includes fluid introduction means for introducing fluid into the tank adjacent one of the end walls of the tank and fluid draining means for draining fluid from the other end wall of the tank, wherein fluid introduced into the tank by the introduction means travels toward the draining means in a direction opposite to the direction in which the poultry travels along the poultry travel path.

5. The poultry scalding apparatus as recited in claim 4. wherein the cascading means includes an elongated trough extending on each side of the poultry travel path along said preset length of the tank and at least one pump which pumps fluid from the tank to the troughs, each of the troughs including an elongated edge over which fluid pumped into the trough cascades onto the travel path in the tank.

6. A two-stage scalding apparatus comprising:
an elongated first tank section having opposed side walls, end walls and a bottom wall, and defining a poultry travel path extending generally in the longitudinal direction of the first tank section, the tank being adapted to hold fluid therein;
means for maintaining a fluidline in the first tank section at a first predetermined height above the bottom wall;
fluid delivery means for delivering fluid to the first tank section from both sides of the poultry travel path at a generally constant height above the fluid line along at least a portion of the length of the first tank section; and
conveying means for conveying poultry along the poultry travel path in a head-down orientation with the poultry disposed substantially below the height at which fluid is delivered to the first tank section and with the poultry supported completely above the fluidline; and
an elongated second tank section adjoining the first tank section and defining a continuation of the poultry travel path, the second tank section being filled with fluid to a second predetermined vertical height, the conveying means conveying poultry along the poultry travel path of both the first and second tank sections, the poultry being conveyed within the second tank section along the poultry travel path with the poultry disposed substantially completely beneath the fluid therein.

7. The poultry scalding apparatus as recited in claim 6, wherein the conveying means includes lowering and lifting means for moving the poultry vertically during movement along the travel path within the first tank section between a first elevation at which the poultry is supported at least partially above the generally constant height at which fluid is delivered to the first tank section and a second elevation at which the poultry is supported substantially completely beneath the generally constant height at which fluid is delivered to the first tank section such that the head and neck of the poultry is exposed to cascading fluid for a longer period of time than the remainder of the poultry during passage of the poultry through the first tank section.

8. The poultry scalding apparatus as recited in claim 7, wherein the conveying means sequentially moves the poultry from the first elevation to the second elevation and again toward the first elevation during movement of the poultry along the poultry travel path within the first tank section.

9. The poultry scalding apparatus as recited in claim 7, further comprising fluid introduction means for introducing fluid into the first tank section adjacent one of the end walls of the first tank section and fluid draining means for draining fluid from the other end wall of the first tank section, wherein fluid introduced into the first tank section by the introduction means travels toward the draining means in a direction opposite to the direction in which the poultry travels along the poultry travel path within the first tank section.

10. The poultry scalding apparatus as recited in claim 9, wherein the fluid delivery means includes an elongated trough extending on each side of the poultry travel path along said portion of the length of the first tank section and at least one pump which pumps fluid from the first tank section to the troughs, each of the troughs including an elongated edge over which fluid pumped into the trough cascades onto the travel path in the first tank section.

11. The poultry scalding apparatus as recited in claim 9, wherein the fluid introduction means includes second tank section filling means for filling the second tank section with fluid at a position along the poultry travel path that is remote from the first tank section and for continuously supplying fluid to the second tank section such that fluid from the second tank section overflows into the first tank section thus introducing fluid into the first tank section.

12. A method of scalding poultry comprising the steps of:
delivering fluid to a first tank section from both sides of a poultry travel path defined by the first tank section at a generally constant first predetermined height along at least a portion of the length of the first tank section;
maintaining the fluid level in the first tank section at a generally constant second predetermined height:
conveying poultry along the poultry travel path in a head-down orientation and simultaneously moving the poultry vertically as the poultry travels along said portion of the length of the first tank section between a first elevation at which the poultry is supported at least partially above the first elevation at which fluid is delivered to the first tank section and a second elevation at which the poultry is supported substantially completely beneath the first predetermined height at which fluid is delivered to the first tank section such that the head and neck of the poultry is exposed to the fluid for a longer period of time than the remainder of the poultry, the poultry being supported above the fluid level during movement of the poultry along he portion of the length of the first tank section in which fluid is delivered to the first tank section.

13. The method as recited in claim 12, wherein the poultry is sequentially moved from the first elevation to the second elevation and again toward the first elevation during movement of the poultry along the poultry travel path.

14. The method as recited in claim 12, further comprising the step of introducing fluid into the first tank section adjacent one of the end walls of the first tank section and draining fluid from the other end wall of the first tank section, wherein fluid introduced into the first tank section travels in a direction opposite to the direction in which the poultry travels along the poultry travel path.

15. The method as recited in claim 12, further comprising the step of conveying poultry along the poultry travel path of both the first tank section and a second tank section adjoining the first tank section and defining a continuation of the poultry travel path, the second tank section being filled with fluid to a second predetermined vertical height, the poultry being conveyed within the second tank section along the poultry travel path with the poultry disposed substantially completely beneath the fluid therein.

16. The poultry scalding apparatus as recited in claim 15, further comprising the step of continuously supplying fluid to the second tank section at a position along the poultry travel path that is remote from the first tank section such that fluid from the second tank section overflows into the first tank section.

* * * * *